(12) United States Patent
Bergwall et al.

(10) Patent No.: US 10,919,096 B2
(45) Date of Patent: Feb. 16, 2021

(54) MODULAR CLAMPING SYSTEM

(71) Applicant: System 3R International AB, Vaellingby (SE)

(72) Inventors: Jan Bergwall, Gaevle (SE); Hakan Dahlquist, Haesselby (SE); Jonas Rosengren, Bromma (SE)

(73) Assignee: SYSTEM 3R INTERNATIONAL AB, Vaellingby (SE)

( * ) Notice: Subject to any disclaimer, the term of this patent is extended or adjusted under 35 U.S.C. 154(b) by 0 days.

(21) Appl. No.: 16/449,556

(22) Filed: Jun. 24, 2019

(65) Prior Publication Data

US 2020/0001375 A1  Jan. 2, 2020

(30) Foreign Application Priority Data

Jun. 29, 2018 (EP) .................................... 18180723

(51) Int. Cl.
| | | |
|---|---|---|
| *B23B 31/107* | (2006.01) | |
| *B23B 31/113* | (2006.01) | |
| *B22F 3/03* | (2006.01) | |
| *B30B 15/02* | (2006.01) | |
| *B23Q 3/18* | (2006.01) | |

(52) U.S. Cl.
CPC ............ *B23B 31/1071* (2013.01); *B22F 3/03* (2013.01); *B23B 31/113* (2013.01); *B23Q 3/18* (2013.01); *B30B 15/026* (2013.01); *Y10T 279/1291* (2015.01); *Y10T 279/17752* (2015.01); *Y10T 279/17888* (2015.01)

(58) Field of Classification Search
CPC ..... B23B 31/1071; B23B 31/113; B22F 3/03; B23Q 3/18; B30B 15/026; Y10T 279/1291; Y10T 279/17752; Y10T 279/17888
See application file for complete search history.

(56) References Cited

U.S. PATENT DOCUMENTS

| | | | | |
|---|---|---|---|---|
| 5,190,272 A | * | 3/1993 | Zika ................... | B23B 31/1071 269/309 |
| 6,170,836 B1 | * | 1/2001 | Etter ................... | B23Q 1/0072 269/26 |
| 6,367,814 B1 | | 4/2002 | Luscher et al. | |
| 6,641,128 B2 | * | 11/2003 | Fries ................... | B23Q 1/0072 269/309 |
| 7,429,049 B2 | * | 9/2008 | Kramer ............... | B23B 31/1071 279/2.03 |

(Continued)

FOREIGN PATENT DOCUMENTS

| | | | | |
|---|---|---|---|---|
| DE | 19861091 A1 | * | 7/2000 | ........... B23Q 1/0072 |
| DE | 10317343 A1 | * | 11/2004 | ........... B23Q 1/0072 |

(Continued)

*Primary Examiner* — Eric A. Gates
(74) *Attorney, Agent, or Firm* — Leydig, Voit & Mayer, Ltd.

(57) ABSTRACT

A modular clamping device for a tool or a workpiece includes: a pallet having a plurality of x-y references and a plurality of z references for alignment with a chuck and a clamping unit, which is arranged in a clamped state concentrically at an outside of the chuck. In the clamped state, a tubular part is arranged concentrically between the pallet and the clamping unit, the tubular part being connected to the pallet by a first connecting mechanism and connected to the clamping unit by a second connecting mechanism.

18 Claims, 6 Drawing Sheets

(56) References Cited

U.S. PATENT DOCUMENTS

| | | | |
|---|---|---|---|
| 7,770,900 B2 * | 8/2010 | Bechteler | B23B 31/36 279/2.12 |
| 8,152,151 B2 | 4/2012 | Sandmeier | |
| 8,262,327 B2 * | 9/2012 | Chen | B23B 31/1071 409/234 |
| 8,496,458 B2 * | 7/2013 | Casperson | B22F 3/03 425/78 |
| 9,108,286 B2 * | 8/2015 | Casperson | B23B 31/113 |
| 9,527,139 B2 * | 12/2016 | Mellstrom | B23B 31/113 |
| 9,827,615 B2 * | 11/2017 | Chuang | B23B 31/028 |
| 9,863,456 B2 * | 1/2018 | Canuto | F16B 21/073 |
| 10,105,855 B2 * | 10/2018 | Kalb | B23B 31/1071 |
| 10,493,575 B2 * | 12/2019 | Hediger | B23B 31/1071 |
| 2008/0197584 A1 | 8/2008 | Casperson | |

FOREIGN PATENT DOCUMENTS

| | | | | |
|---|---|---|---|---|
| DE | 102004020228 A1 * | 11/2005 | | B23Q 1/0072 |
| DE | 102005031784 A1 * | 1/2007 | | B23Q 1/0072 |
| EP | 0873815 A2 * | 10/1998 | | B23Q 1/0072 |
| EP | 1068918 A1 | 1/2001 | | |
| EP | 1741511 A1 | 1/2007 | | |

* cited by examiner

MODULAR CLAMPING SYSTEM

CROSS-REFERENCE TO PRIOR APPLICATION

Priority is claimed to European Patent Application No. EP 18 180 723.1, filed on Jun. 29, 2018, the entire disclosure of which is hereby incorporated by reference herein.

FIELD

The present invention relates to a clamping device, in particular to a modular clamping device for the application in the field of powder metallurgy.

BACKGROUND

The modular clamping device is particularly used in powder press applications where the axial pressing force is very high and simultaneously with very high requirements on position accuracy.

Presses for powder metallurgy are used for pressing of small carbide steel inserts up to sintered larger parts as gears for the automotive industry. The press force depends on the press area and is normally 10 tons for small parts and up to 500 tons for large parts. The powder metallurgy presses requires a press adapter, which is a unit that could be taken out of the press for installing the press tooling. The press adapter is often equipped with clamping devices for quick clamping of the press tooling i.e. the upper and lower punch and the die in the middle. During pressing the punch-and-die tooling is applied such that opposing punches squeeze the powders contained in a die. For some applications, multi punches are also used.

Since during press the clamping device is also under the high press force, the clamping devices for clamping the press tooling must withstand the very high press forces and also position the punches and die with an accuracy of +−1.0 micron and better. The accuracy is needed to ensure the very small gap between the punches and die. The gap is only a few microns. It needs to be small otherwise there will be a powder leakage and a burr on the finished part.

A further problem is that there could be a high withdrawal force needed to pull out the punch of the die. This is due to remaining high friction force after the powder compacting. This leads to requirement on the clamping device to provide a high clamping force. There must not be the slightest lift-off of the pallet from the chuck.

In further, metal powder will, after a time of use, penetrate the roller clamping mechanism. It is then needed to do a full cleaning service. Prior art clamping devices must often be dismounted, disassembled, cleaned and remounted. This will lead to a costly still stand of the press and requires a new chuck alignment.

Moreover, the alignment of press clamping devices on micron level is quite difficult and requires a certain skill and experience from the installer. The alignment is normally done by fine knocking of the chuck from outside with a tool. Devices for automatic knocking are not able to be placed around the chuck due to lack of space in the press adaptor.

U.S. Pat. No. 8,152,151 discloses a clamping fixture comprise a chuck and a workpiece pallet. The chuck is provided with a clamping mechanism for locating the workpiece pallet. The clamping mechanism comprises a plurality of clamping members configured as plungers. The workpiece pallet comprises a clamping surface running essentially along its shell surface for surface contacting the plungers by its front part provided with a compression surface during clamping.

EP 1068918 discloses a device for mounting a workpiece in a defined position in the working region of a machine tool. The device has a chuck and a work carrier which can be put onto the chuck and is to be firmly clamped thereon. The device comprises a plurality of locating elements and chucking arrangement, the chucking force of which holds the work carrier in place on the chuck in the position established by the positioning means. The chucking arrangement comprises for example a plurality of chucking balls as chucking members. The chucking balls are arranged around the circumference of the chuck for interacting with an encircling annular groove arranged in the inner surface of the work carrier.

In these devices the radial forces from the clamping balls are not equalizing each other, which results side forces on the pallet. Therefore, inaccuracy between the pallet and the chuck occurs at the moment of clamping. For the application in which a high-positioning accuracy is required, such side force should be avoided.

EP 1 74 1511 discloses a clamping device comprising one chuck and one holder. The holder has an upper part and a tubular extension. The upper part is detachably connected to the tubular extension. The clamping device has an inner chuck and an outer chuck, the inner chuck being fixedly connected concentrically to the outer chuck. The tubular extension can be clamped to the inner and/or outer chuck.

The clamping device disclosed in EP 1 74 1511 is not suitable for the application, in which high press force resistance is required.

SUMMARY

In an embodiment, the present invention provides a modular clamping device for a tool or a workpiece, comprising: a pallet having a plurality of x-y references and a plurality of z references configured for alignment with a chuck and a clamping unit, which is arranged in a clamped state concentrically at an outside of the chuck, wherein, in the clamped state, a tubular part is arranged concentrically between the pallet and the clamping unit, the tubular part being configured such that it is connected to the pallet by a first connecting mechanism and connected to the clamping unit by a second connecting mechanism.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
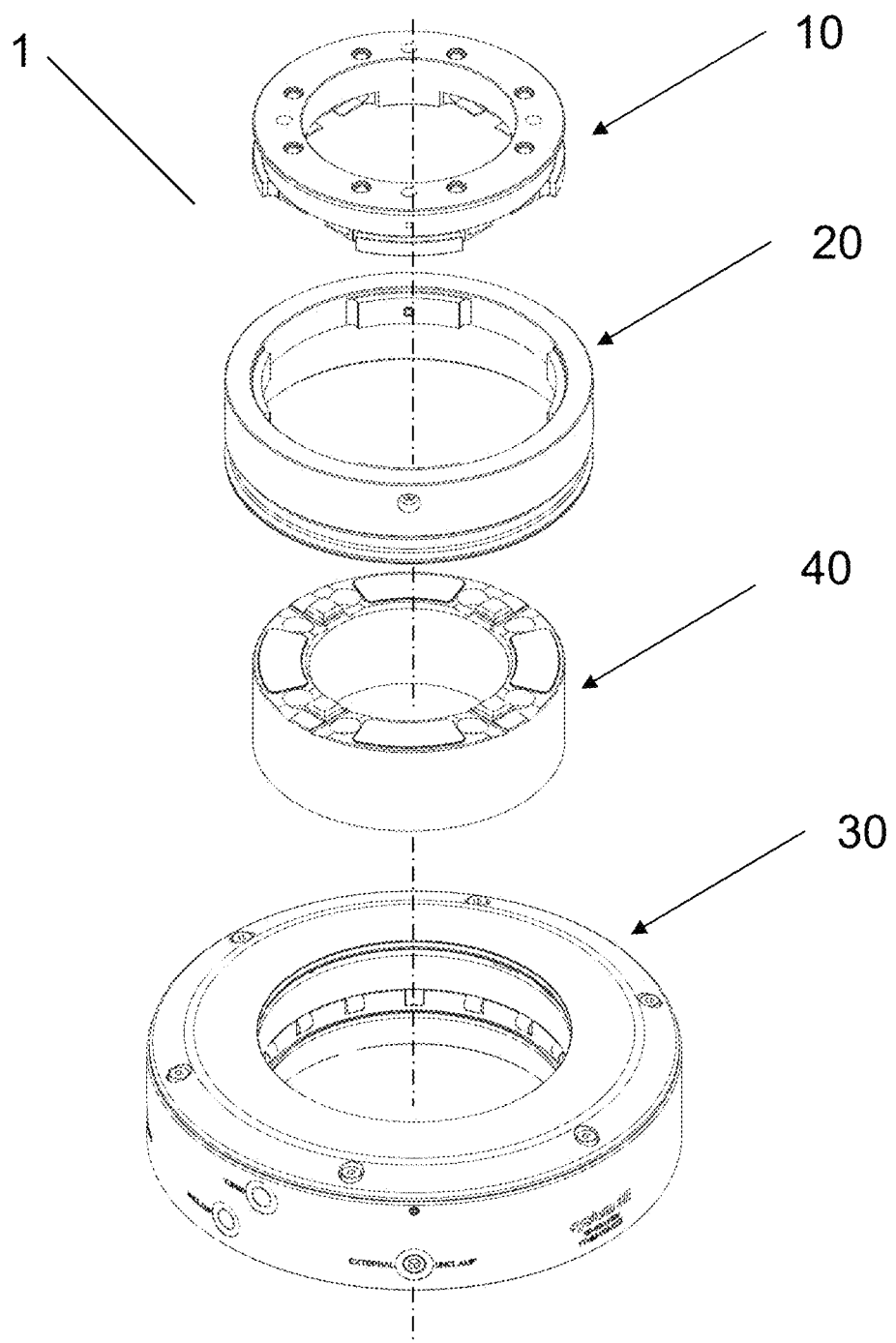
FIG. 1 illustrates a modular clamping device.

It is an objective of this invention to provide an improved modular clamping device, which has a high clamping force, high-press force resistance, high axial rigidity and high positioning accuracy.

In an embodiment, the invention is directed to a modular clamping device for a tool or a workpiece including a pallet having a plurality of x-y references and a plurality of z references for alignment with a chuck and a clamping unit, which is arranged in the clamped state concentrically at the outside of the chuck. In the clamped state, a tubular part is arranged concentrically between the pallet and clamping unit, and the tubular part is designed such that it is connected to the pallet by a first connecting mechanism and connected to the clamping unit by a second connecting mechanism.

The invention consists of a modular clamping device comprising a chuck part, a clamping unit, a tubular part and a pallet. The clamping device is particularly used in powder press applications where the axial pressing force is very high and simultaneously with very high requirements on position accuracy. The pallet having a plurality of x-y references for alignment with a chuck ensures the position accuracy in the clamped state.

In further, in the clamped state, the tubular part is arranged concentrically between the pallet and clamping unit, this means, the tubular part is arranged at the outer peripheral of the pallet and can be connected to the pallet by the first connecting mechanism. This arrangement has the advantage of avoiding the side forces. In the clamped state, the clamping unit is located at the outside of tubular part, the chuck part and the pallet. By that, the height of the complete clamping device in the clamped state becomes very low. The pallet is then lowered into the center of the clamping unit. It is of great importance to have a clamping device for pressing as low as possible. This allows the upper and lower punch chucks to come as close as possible to the die chuck placed in between.

In some embodiments, the height of the chuck is smaller than the height of the clamping unit.

In some embodiments, in the clamped state, the first connecting mechanism and the second mechanism are located at two different positions in the Z-direction to provide a better distribution of the force from the clamping unit to create a pure axial force in the tubular part. The height difference allows also a very small pendular movement that is in addition favourable for avoiding any side forces on the bayonette connection.

In one variant, the first connecting mechanism includes at least one first bayonette wing provided on the side surface of the pallet and at least one second bayonette wing provided on the tubular part to be engaged to the first bayonette wing. The bayonette connection of the first bayonette wing and the second bayonette wing is sideways slightly loose until a force from the tubular part is applied and thereby lock them sideways by friction forces. By that, it takes its position during clamping without giving any side forces.

In one preferred variant, the second connecting mechanisms includes a circular ring provided on the side surface of the tubular part and a locking device provided on the side surface of the clamping unit for being locked into the circular ring in the clamped state. The circular ring is embedded into the side surface has a circular and conical surface. Since the tubular part is in the clamped state mounted at the outer peripheral of the pallet, the connecting position of the tubular part and the clamping unit through the second connecting mechanism is located even further outwardly in the radial direction. This is favorable for the rigidity.

In one embodiment, the locking device is in the form of a plurality of rollers or balls arranged in a circular ring. The piston is in the form of a ring and with a circular groove facing the center. In the unclamped state, the piston is moved to upper position, such that the locking device can rest in the groove and thereby the tubular part is unlocked from the chuck. The circular groove has two tapered ring surfaces, one for large radial movement of the locking device and one for applying the high radial force. The clamping piston ring is pressed downward by a number of springs. Pressurized air is used for opening the chuck by pressing the piston against the springs. Pressurized air could also be applied on the spring side to increase the spring force and thereby the clamping force.

In some embodiments, the pallet and/or the chuck is made of solid steel. The solution to withstand very high press forces is solved by the invention by having a solid ring shaped pallet clamped onto a solid chuck part. These two solid pieces of steel will transmit the press force from the punch to the base plate in the press adapter without any deformation other than pure neglectable material deformation.

In a preferred variant, the inner diameter of the tubular part is larger than the outer diameter of the pallet and preferably is in the range of from 50 mm to 250 mm, in particular from 76 mm to 189 mm.

In an advantage variant, a plurality of elastic tongues is provided on the bottom surface of the pallet serving as x-y references. In a preferred variant, four pairs of elastic tongue are provided.

In another variant, a plurality of grooves having sidewalls are formed at the bottom surface of the pallet, in particular, the sidewalls have a tapered profile and serve as x-y references. In a preferred variant, four grooves are symmetrically placed at the bottom surface of the pallet.

The combination with a solid chuck and loosely connected tubular part is essential for the high axial load capacity and high accuracy. The loosely connected tubular part ensures that there are no applied side forces affecting the accuracy during the moment of clamping.

Furthermore, the construction with a chuck in the centre of the clamping device and a surrounding ring shaped clamping unit provide the advantage of a high clamping and withdrawal force. This is due to the large ring shaped piston area in the clamping unit allowing a large amount of piston clamping springs and in addition a high clamping force from air pressure.

An important advantage of the modular design in combination with the bayonette connection of the tubular part is that the clamping unit can be dismounted for service or replacement without affecting the chuck. By that, the clamping unit can be replaced without affecting the accuracy of the chuck. This is often the case at cleaning and service. The same apply at first-time-installation and alignment of the chuck, since it can be conducted by automatic alignment equipment located where the clamping unit later will be placed. The tubular part bayonette connection will guide the clamping unit to the right position and still give no side forces. The loosely function of the bayonette connection allows the clamping unit to be positioned within normal position tolerances as of several hundreds of a millimeter and thus allowing easy dismounting and mounting. This is an important feature as still stand is costly in automatic presses.

Moreover, the ability to mount the clamping unit separately allows a chuck part alignment device to be placed outside the chuck part i.e. where the clamping unit normally is placed. It is also ring shaped. After alignment, the alignment device is dismounted and the clamping device is mounted.

FIG. 1 shows a modular clamping system 1 comprising a pallet 10, a tubular part 20, a chuck part 40 and a clamping unit 30.

Figure 2:
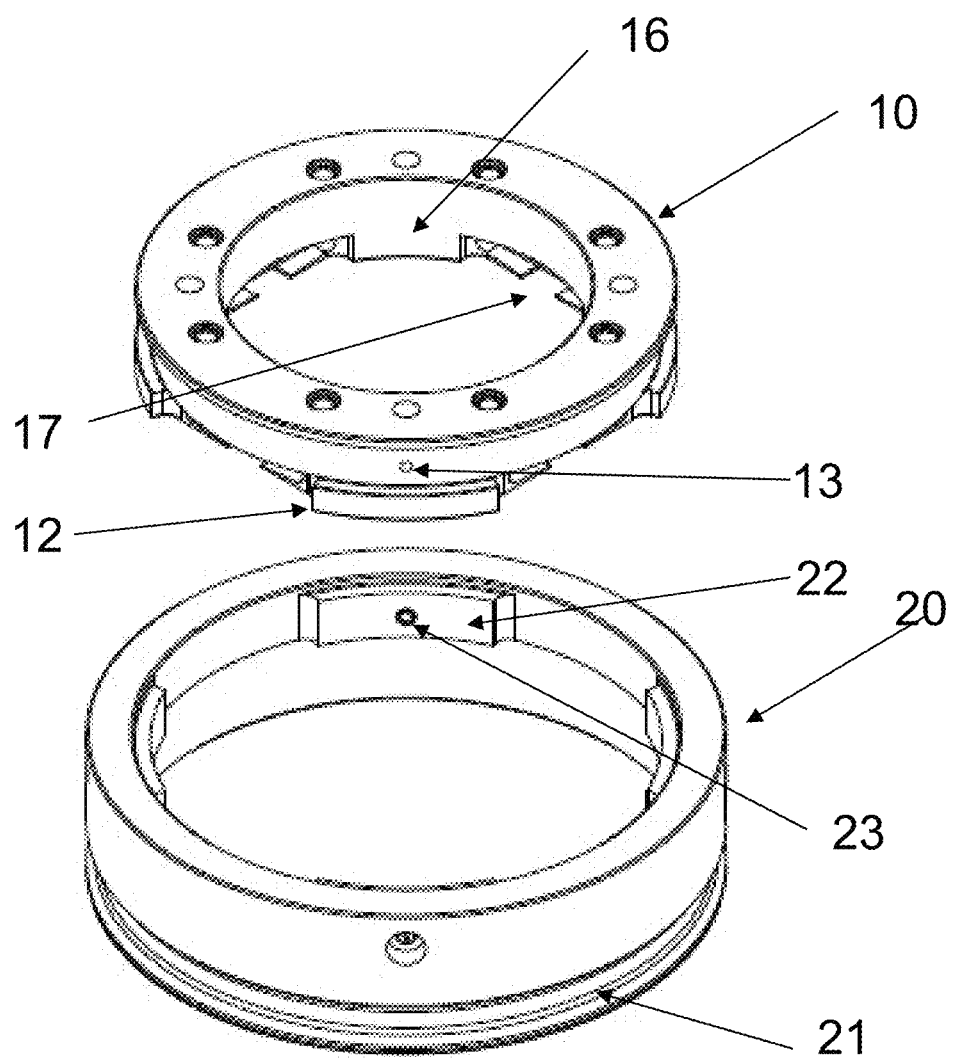
FIG. 2 illustrates one embodiment of a pallet and a tubular part.

FIG. 2 shows the pallet 10 in an exploded view together with a tubular part 20. The pallet is provided with x-y references for positioning in x-y directions and z references in z-direction. In this embodiment, the x-y references are formed by four pair of elastic tongues 17. However, other variants for example in form of grooves are also applicable for the present invention. The flat surface 16 on the lower side of the pallet forms the z references.

The pallet can be mounted into the tubular part and connected to it by a first connecting mechanism. In the embodiment shown in FIG. 2, the pallet is provided with four first bayonette wings 12 for engagement in the four corresponding second bayonette wing 22 provided on the tubular part. The first bayonet wings and the second bayonette wings form the first connecting mechanism. In the middle of the second bayonette wings 22 a spring loaded ball 23 is moveably arranged and is slightly protruded from the surface. The balls 23 can be pressed into the small recess 13 on the side surface of the pallet when the pallet is mounted into the tubular part. By that, the tubular part is slightly locked into its position and prevented from loosen from the pallet by accidently rotation at manual handling. The tubular part 20 is further provided with a circular ring 21 having a conical surface, which forms a part of a second connecting mechanism.

Figure 3:
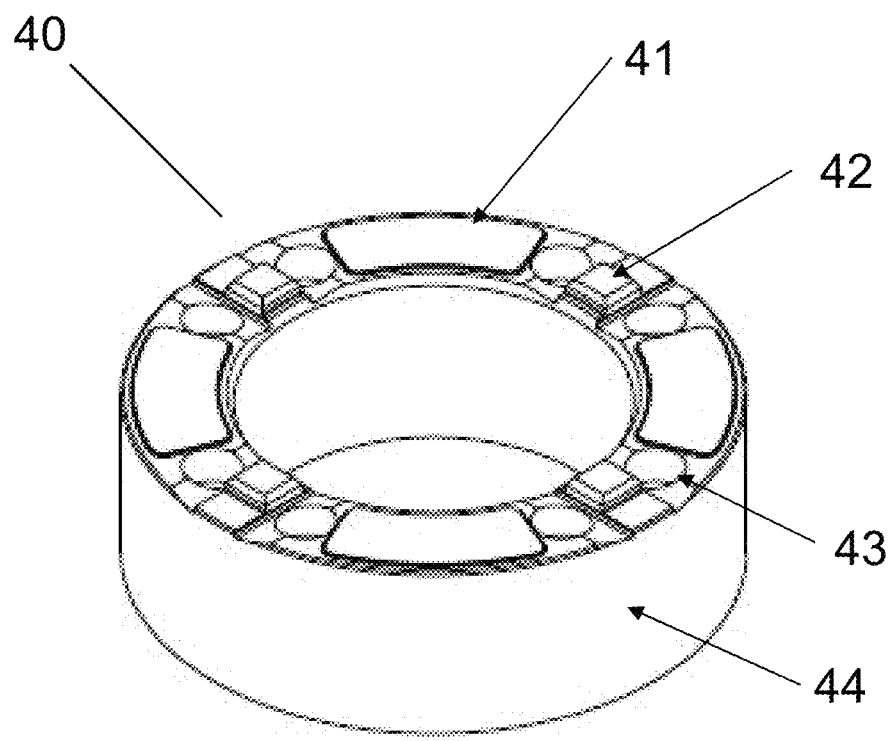
FIG. 3 illustrates a chuck.

The FIG. 3 shows a chuck 40, which is made in one solid piece of material and provided with references for positioning the pallet 10 in all directions and rotations in a xyz coordinate system. The four upper flat surfaces 41 form the z references and the four bars 42 protruding from the surface and having tapered side-surfaces can be aligned to the x-y references provided on the pallet. For example the front edges of the elastic tongue pairs or the solid edges of grooves of the pallet can be aligned to the bars 42. The chuck is preferably mounted on a press adapter plate or on a machine table by screws through the six holes 43. The portion of material 44 between the four upper surfaces 41 is solid in order to achieve a maximal stiffness.

Figure 4:
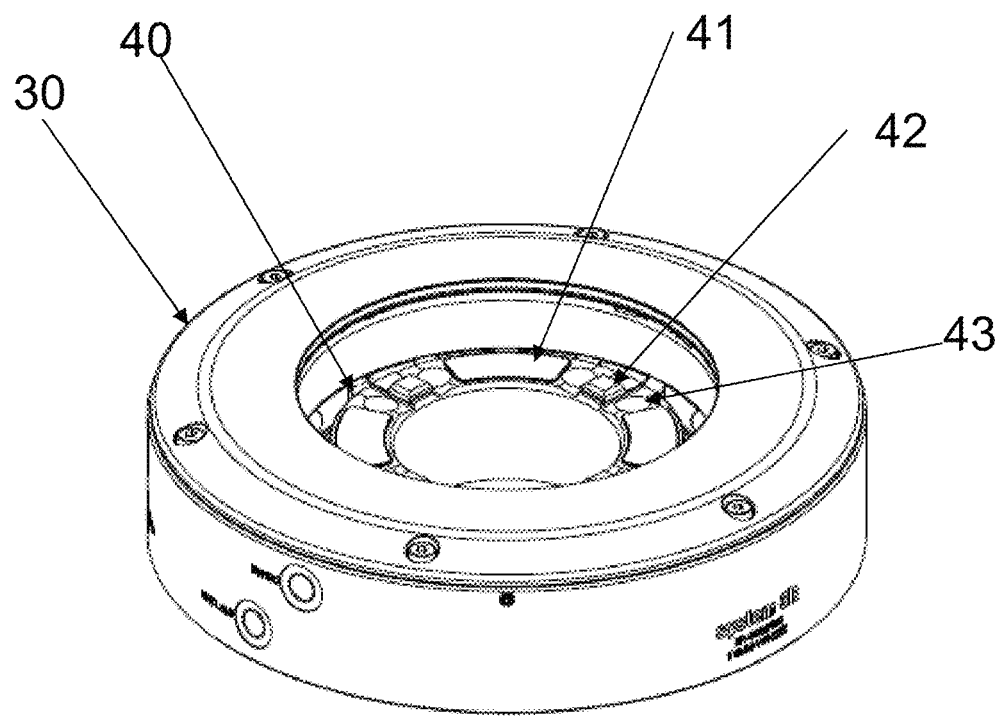
FIG. 4 illustrates a view of arranging the chuck in a clamping unit.

FIG. 4 shows the chuck 40 and the clamping unit 30 in a mounted state. The chuck is lowered into the clamping unit such that the pallet can be mounted on the top of the chuck and the upper surface of the pallet is in a clamped state almost in the same plan as the upper surface of the clamping device.

Figure 5:
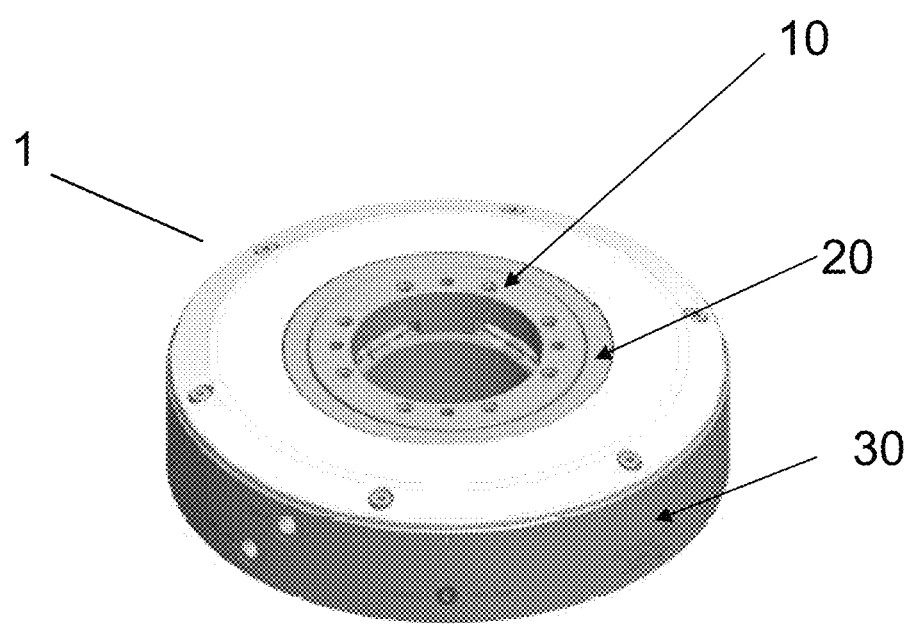
FIG. 5 illustrates a clamped state of the modular clamping device.
Figure 6:
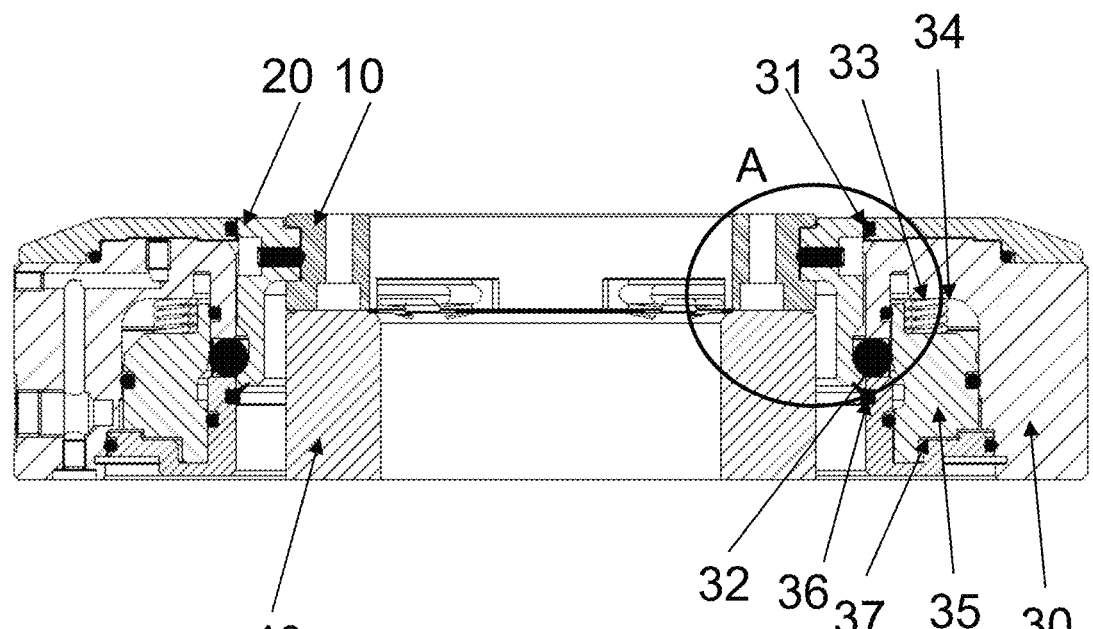
FIG. 6 illustrates a section view of the modular clamping device in the clamped state.
Figure 7:
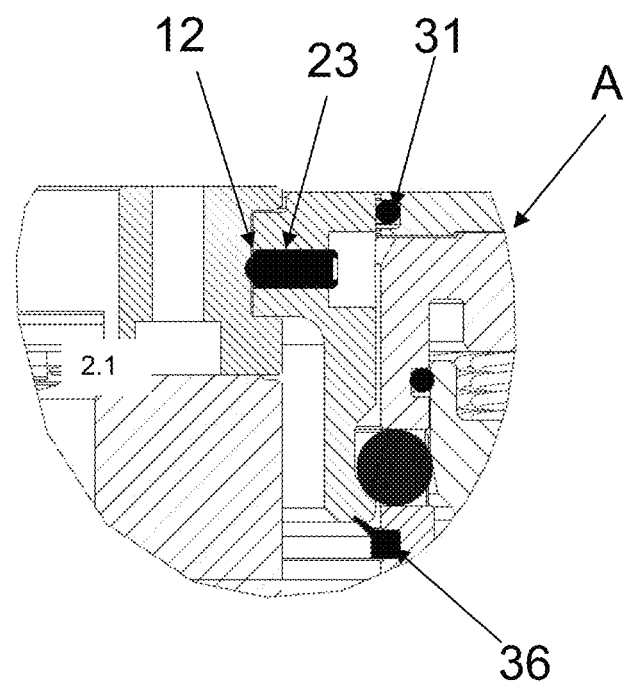
FIG. 7 illustrates an enlarged view of a part of FIG. 6.

FIGS. 5 and 6 illustrate the modular clamping device 1 in the clamped state. An enlarged view of the part A of FIG. 6 is shown in FIG. 7. The pallet 10 and the tubular part 20 are also seen in the cross section of the clamping device. The magnified cross section of the right portion of the clamping device shows the first connecting mechanism between the first bayonette wing 12 and the second bayonette wing 22, and the second connecting mechanism including a locking means such as a plurality of rollers or balls 32. It shows the connecting state of the first connecting mechanism, in which the rolls or the balls 23 are locked into the circular ring 21 provided on the side surface of the tubular part 20.

A first chamber 34 located above a clamping piston 35 is designed for air pressure to increase the force on the clamping piston. A second chamber 37 below the clamping piston is provided for opening air pressure on the piston. To ensure a reliable sealing, an upper sealing 31 and a lower sealing 36 are arranged on the upper part and lower part of the clamping unit respectively.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCES 1 clamping device
10 pallet
12 first bayonette wing
13 recess
16 Z-reference of pallet
17 Elastic tongues
20 tubular part
21 circular ring of tubular part
22 second bayonetted wing
23 spring loaded ball
30 clamping unit
31 upper sealing
32 locking device (roller or ball)
33 clamping piston springs
34 first chamber
35 clamping piston
36 lower sealing
37 second chamber
40 chuck
41 Z-reference of chuck
42 X-Y reference of chuck
43 hole

What is claimed is:

1. A modular clamping device for a tool or a workpiece, comprising:
a pallet having a plurality of x-y references and a plurality of z references configured for alignment with a chuck and a clamping unit, which is arranged in a clamped state concentrically at an outside of the chuck,
wherein, in the clamped state, a tubular part is arranged concentrically between the pallet and the clamping unit, the tubular part being configured such that it is connected to the pallet by a first connecting mechanism and connected to the clamping unit by a second connecting mechanism, and
wherein an inner diameter of the tubular part is larger than an outer diameter of the pallet.

2. The modular clamping device according to claim 1, wherein a height of the chuck is smaller than a height of the clamping unit.

3. The modular clamping device according to claim 1, wherein, in the clamped state, the first connecting mechanism and the second mechanism are located at two different positions in a Z-direction.

4. The modular clamping device according to claim 1, wherein the first connecting mechanism includes at least one first bayonette wing provided on an outer surface of the pallet and at least one second bayonette wing provided on an inner surface of the tubular part for engagement to the first bayonette wing.

5. The modular clamping device according to claim 1, wherein the second connecting mechanism includes a circular ring provided on a side surface of the tubular part and a locking device provided on a side surface of the clamping unit for locking into the circular ring in the clamped state.

6. The modular clamping device according to claim 5, wherein the locking device comprises a plurality of rollers or balls.

7. The modular clamping device according to claim 1, wherein the pallet is comprised of solid steel.

8. The modular clamping device according claim 1, further comprising a plurality of elastic tongues on a bottom surface of the pallet, the plurality of elastic tongues serving as x-y references.

9. The modular clamping device according claim 8, wherein the plurality of elastic tongues comprises four pairs of elastic tongues.

10. The modular clamping device according claim 1, wherein a plurality of grooves having sidewalls are formed at a bottom surface of the pallet.

11. The modular clamping device according claim 10, wherein the plurality of grooves comprises four grooves, and wherein the sidewalls have a tapered profile and serve as x-y references.

12. The modular clamping device according claim 10, wherein the sidewalls have a tapered profile and serve as x-y references.

13. The modular clamping device according to claim 1, wherein the chuck is comprised of solid steel.

14. The modular clamping device according to claim 1, wherein the clamping unit is dismountable for service or replacement without affecting a chuck position.

15. The modular clamping device according to claim 1, wherein the inner diameter of the tubular part is in a range of from 50 mm to 250 mm.

16. The modular clamping device according to claim 15, wherein the inner diameter of the tubular part is in a range of from 76 mm to 189 mm.

17. A modular clamping device for a tool or a workpiece, comprising:
a pallet having a plurality of x-y references and a plurality of z references configured for alignment with a chuck and a clamping unit, which is arranged in a clamped state concentrically at an outside of the chuck,
wherein, in the clamped state, a tubular part is arranged concentrically between the pallet and the clamping unit, the tubular part being configured such that it is connected to the pallet by a first connecting mechanism and connected to the clamping unit by a second connecting mechanism,
wherein a plurality of grooves having sidewalls are formed at a bottom surface of the pallet,
wherein the plurality of grooves comprises four grooves, and
wherein the sidewalls have a tapered profile and serve as x-y references.

18. A modular clamping device for a tool or a workpiece, comprising:
a pallet having a plurality of x-y references and a plurality of z references configured for alignment with a chuck and a clamping unit, which is arranged in a clamped state concentrically at an outside of the chuck,
wherein, in the clamped state, a tubular part is arranged concentrically between the pallet and the clamping unit, the tubular part being configured such that it is connected to the pallet by a first connecting mechanism and connected to the clamping unit by a second connecting mechanism,
wherein a plurality of grooves having sidewalls are formed at a bottom surface of the pallet, and
wherein the sidewalls have a tapered profile and serve as x-y references.

* * * * *